E. F. TRIPP.
CHEESE CUTTER.
APPLICATION FILED DEC. 9, 1914.
1,162,713.
Patented Nov. 30, 1915.
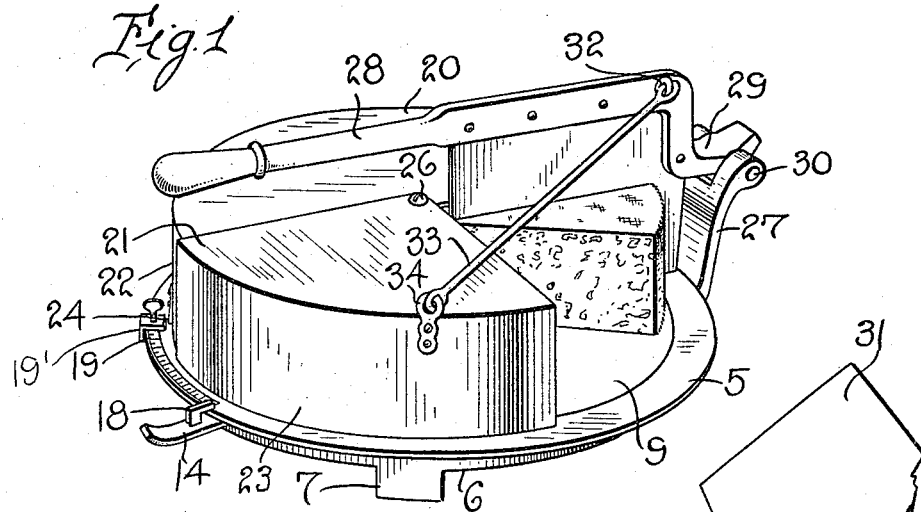
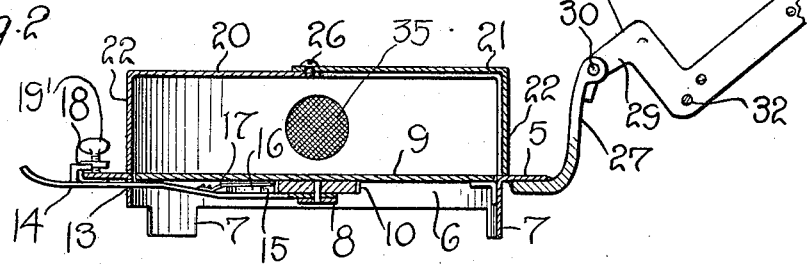
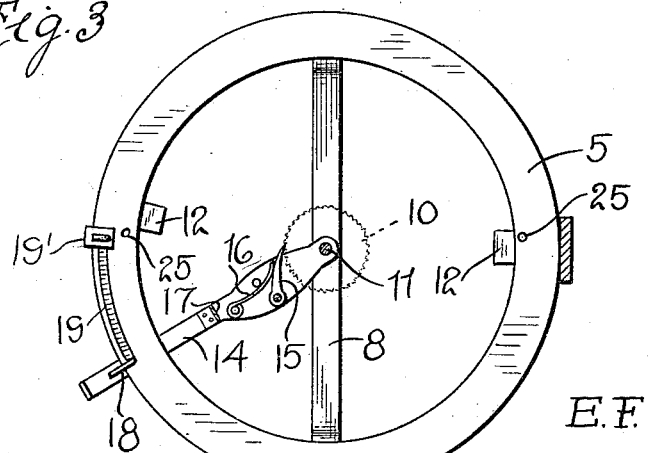
Witnesses
Robert M. Lutphen
A. I. Hind
Inventor
E. F. Tripp
By Watson E. Coleman
Attorney

UNITED STATES PATENT OFFICE.

EDGAR F. TRIPP, OF KINGSTON, OKLAHOMA, ASSIGNOR OF ONE-HALF TO JOHN J. TRIPP, OF MACOMB, OKLAHOMA.

CHEESE-CUTTER.

1,162,713.      Specification of Letters Patent.      Patented Nov. 30, 1915.

Application filed December 9, 1914. Serial No. 876,340.

*To all whom it may concern:*

Be it known that I, EDGAR F. TRIPP, a citizen of the United States, residing at Kingston, in the county of Marshall and State of Oklahoma, have invented certain new and useful Improvements in Cheese-Cutters, of which the following is a specification, reference being had to the accompanying drawings.

This invention relates to improvements in cheese cutters, and has for its primary object to provide a device of this character embodying covering means connected to the cutting knife and automatically actuated thereby whereby the cheese or other material is covered and protected when the knife is elevated.

The invention has for another object to provide a rotatable platform or base to receive the cheese, and simple and efficient means for rotating said base whereby a predetermined quantity of cheese may be cut in the manipulation of the knife.

It is an additional object of my invention to generally improve and simplify the construction of devices of the above character whereby the same may be manufactured and sold at comparatively small cost, and the cheese or other commodity expeditiously cut and undue waste thereof eliminated.

With the above and other objects in view, my invention consists in the novel features of construction, combination, and arrangement of parts to be hereinafter more fully described, claimed, and illustrated in the accompanying drawing, in which, Figure 1 is a perspective view of a cheese cutter embodying the present invention in its preferred form; Fig. 2 is a vertical section through the device, the knife blade being elevated and the movable cover in its closed position; and Fig. 3 is a top plan view, the platform being removed.

Referring in detail to the drawing, 5 designates a frame which includes an annular metal plate having a depending flange 6 which is formed upon its inner edge, said flange being provided at intervals with foot extensions 7. The annular frame plate is connected at diametrically opposite points by the horizontal metal bar 8 having its intermediate portion offset below the plane of the ends of said bar.

A rotatable disk or platform 9 is adapted to be mounted in the frame 5, and this platform which is preferably constructed of wood, has fixed upon its bottom face a concentrically located ratchet disk 10. This disk is provided with a central post or pivot 11 which is adapted for loose engagement in an opening centrally formed in the frame bar 8. The outer edge portion of the rotatable platform is supported upon the ends of the bar 8 and upon inwardly projecting lugs 12 which are fixed to the depending flange 6 of the frame. Upon the platform 9, the cheese, cake, or other commodity, is adapted to be placed. The flange 6 of the frame has an arcuate slot 13 formed therein at one side and immediately below the annular body of the frame, through which a lever 14 extends. The inner end of this lever is provided with an opening through which the central rod 11 of the cheese supporting platform is disposed, the end of said lever being located between the ratchet disk 10 and the frame bar 8. Upon the lever 14 a pawl or dog 15 is pivotally mounted at one of its ends, the free end of said dog being yieldingly held by means of a leaf spring 16, in engagement with the teeth of the ratchet 10 on the supporting platform. This ratchet dog and spring are preferably covered by means of a plate 17 suitably secured to the lever 14. Upon the outer end of said lever which projects beyond the annular frame 5, an index member 18 is secured for movement over a graduated scale 19 provided upon the upper surface of said frame plate. This scale is provided to indicate pounds and fractional parts thereof. An adjustable stop member 19' is movable over the scale 19 and limits the movement of the lever 14 whereby the quantity of cheese cut in the movement of the knife, to be hereinafter referred to, may be accurately determined.

20 designates a stationary cover section, and 21 a movable cover section, the latter being of segmental form and preferably constituting one-quarter of the entire cover. Each cover section is provided upon its outer edge with a flange 22 and 23, respectively, and the flange 22 of the stationary section has rods or pins 24 fixed thereto and depending below its lower edges. These pins are adapted to be received in openings 25 formed in the annular frame plate 5. The movable cover section 21 is connected to the stationary section by means of the pivot bolt 26.

To the annular frame plate 5 and on the opposite side thereof with respect to the lever 14, an upwardly projecting supporting arm 27 is fixed. A lever 28 is provided at one end with an angularly disposed portion 29 which is pivotally mounted upon the pin or bolt 30 secured in the upper end of said supporting arm. To this lever, the cutting blade or plate 31 is secured. An eye bolt 32 is secured upon the lever, and one end of a rod 33 is loosely connected to this eye bolt. The other end of this rod is similarly connected to an eye 34 which is secured to the depending flange of the movable cover section 21.

In the use of the device, assuming that the movable section of the cover is in its closed position, when it is desired to cut off a portion from the cake or cheese, butter, or other commodity, the lever 28 is swung from the position shown in Fig. 2 of the drawing to the position shown in Fig. 1. In this movement of said lever and the cutting plate carried thereby, it will be obvious that the rod 33 will act to push upon the movable cover section and swing or turn the same upon the pivot 26 so as to expose the cheese, whereby the knife blade may be forced downwardly upon the same to cut out a predetermined portion or section thereof. The amount or quantity of cheese cut may be readily determined by the movement of the lever 14 until the index carried thereby is disposed in line with the proper graduation on the scale plate 18. When the knife lever is again lifted or elevated, the rod 33 pulls upon the movable cover section and returns the same to its closed position. Thus, the cheese will be entirely covered and protected against raids of rats, cats, mice, or other rodents and also against accumulations of dust and dirt. In the vertical wall of the cover section 20, one or more openings may be provided, said openings being covered by wire gauze indicated at 35. Thus, air may be admitted to the interior of the cheese cover.

From the foregoing description, the construction and arrangement of the several elements employed, as well as the manner of use of my improved cheese cutter, will be fully and clearly understood.

It will be seen that the invention provides a complete cover for the cheese, without necessitating that the same be manually applied. Exposure of the cheese by the neglect of the merchant to replace the cover upon the same, is thus precluded. The device may be very easily and quickly actuated without requiring the manipulation of a large number of parts and is, therefore, highly convenient and serviceable in practical use.

It will, of course, be understood that the device may be made in various sizes so as to receive large or small cakes, and that the several parts employed may also be altered in their form and construction, as may be necessitated in particular circumstances, and I, therefore, reserve the privilege of resorting to all such legitimate changes as may be fairly embodied within the spirit and scope of the invention as claimed.

Having thus fully described my invention, what I desire to claim and secure by Letters Patent is:—

1. A device of the character described including a cover having a pivoted section mounted for swinging movement in a horizontal plane, a movable cutting knife, and means connecting said knife to the pivoted cover section to move the latter to its open or closed position in the manipulation of said knife.

2. A device of the character described including a cover having a pivoted section, a cutting knife movable in a plane at right angles to the pivoted cover section, and means connecting said knife to the pivoted cover section to move the latter to its open or closed position in the manipulation of said knife.

3. In a device of the character described, a cover including a movable cover section, a knife pivotally mounted for movement with respect to said cover section, and means connecting said knife to the movable cover section to move the latter to its open or closed position in the manipulation of said knife.

4. A device of the character described including a cover having a pivoted section mounted for swinging movement in a horizontal plane, a pivotally mounted knife movable in a vertical plane, and means for moving said cover section to its open or closed position in the manipulation of said knife.

5. A device of the character described including a cover having a movable section, a pivotally mounted cutting knife movable with respect to the cover section, and a rod connecting said knife to the cover section to move the latter to its open or closed position when the knife is manipulated.

6. A device of the character described including a cover having a section mounted for horizontal swinging movement, a knife blade mounted for movement in a vertical plane, and a rod connected at its ends to said knife blade and the cover section to move the latter to its open or closed position when the knife blade is manipulated.

In testimony whereof I hereunto affix my signature in the presence of two witnesses.

REV. EDGAR F. TRIPP.

Witnesses:
JNO. LANDHAM,
W. H. BAILEY.

Copies of this patent may be obtained for five cents each, by addressing the "Commissioner of Patents, Washington, D. C."